Aug. 2, 1949.

H. M. GEHL 2,477,794

MACHINE FOR HARVESTING CORN AND
CONVERTING IT INTO ENSILAGE

Filed Oct. 29, 1943

INVENTOR.
HENRY M. GEHL
BY
William F. Buckley
ATTORNEY.

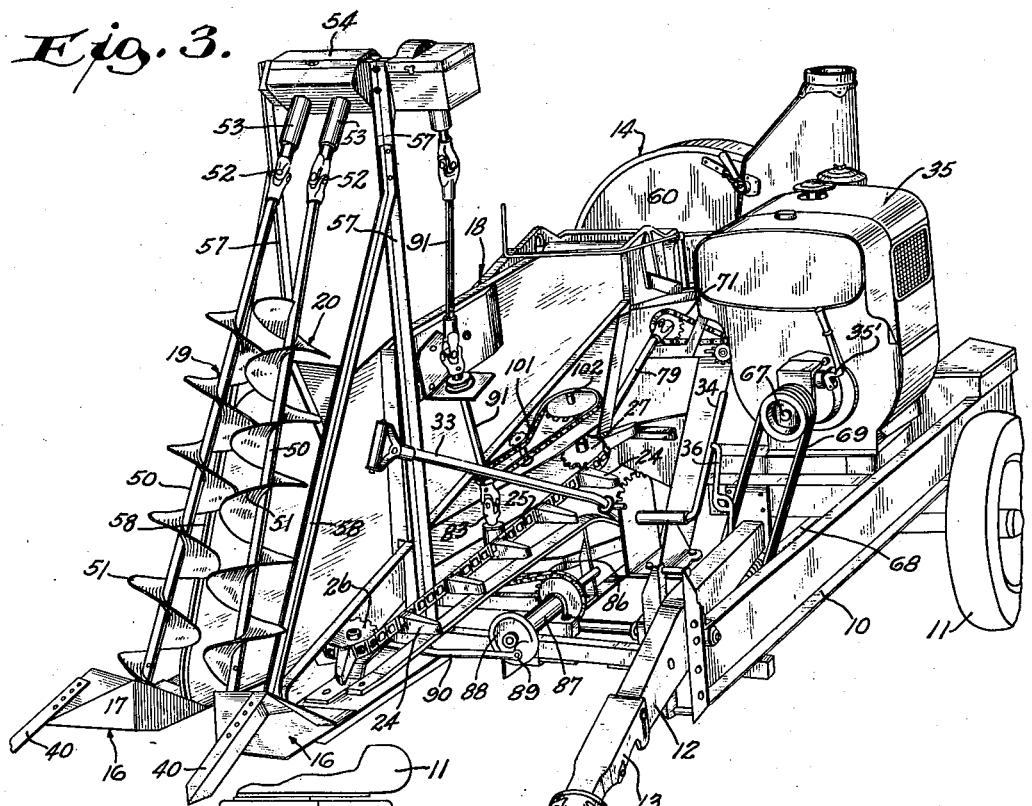
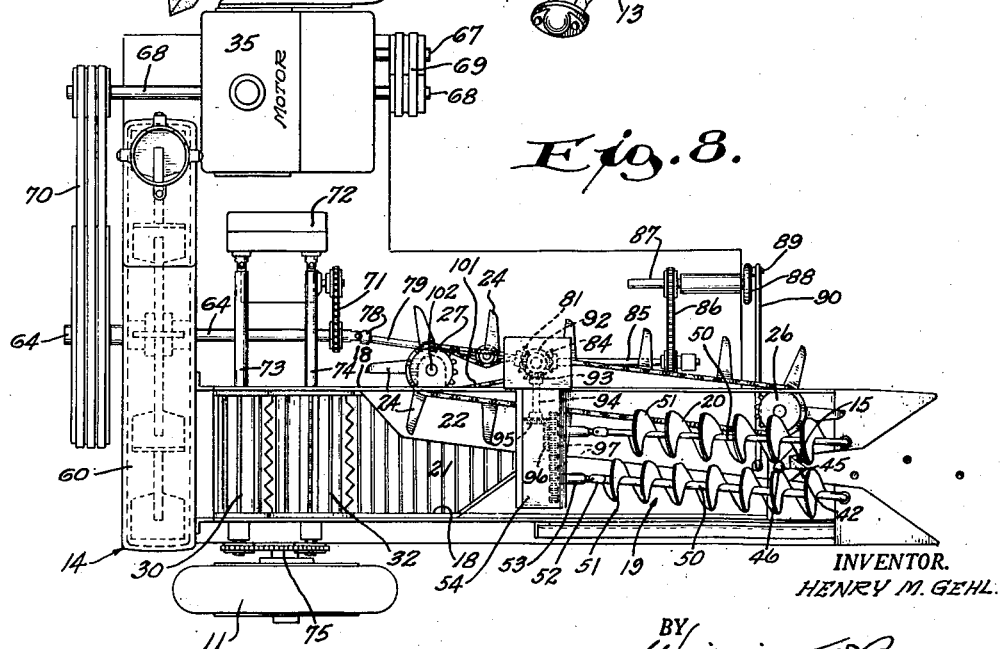

Aug. 2, 1949.    H. M. GEHL    2,477,794
MACHINE FOR HARVESTING CORN AND
CONVERTING IT INTO ENSILAGE
Filed Oct. 29, 1943    4 Sheets-Sheet 3

INVENTOR.
HENRY M. GEHL.
BY William F. Buckley
ATTORNEY.

Aug. 2, 1949.  H. M. GEHL  2,477,794
MACHINE FOR HARVESTING CORN AND
CONVERTING IT INTO ENSILAGE
Filed Oct. 29, 1943  4 Sheets-Sheet 4

INVENTOR.
HENRY M. GEHL.
BY
William F. Buckley
ATTORNEY.

Patented Aug. 2, 1949

2,477,794

UNITED STATES PATENT OFFICE 2,477,794

MACHINE FOR HARVESTING CORN AND CONVERTING IT INTO ENSILAGE

Henry M. Gehl, West Bend, Wis., assignor to Gehl Bros. Manufacturing Co., West Bend, Wis., a corporation of Wisconsin Application October 29, 1943, Serial No. 508,118

10 Claims. (Cl. 56—16)

1

This invention relates to an improvement in machines for harvesting corn and converting it into ensilage, the corn being cut while standing and then as the machine proceeds along the field, chopped or cut up into ensilage or fodder and deposited in a wagon or trailer so that it may be conveniently blown up into a silo.

The object of the invention is to provide a combination corn and corn stalk harvesting machine and ensilage cutter of this character which is so advantageously constituted and organized that it is responsive to the control of a single operator, and yet so efficient and speedy in its action that a substantial acreage of standing corn may be cut and converted into ensilage in a single day. With the machine of moderate size it is entirely practical to harvest and convert into ensilage the standing corn of the order of fifteen acres.

Another object of the invention is to provide a machine of this character and having these advantages and which embodies in its construction a special type of spiral blade or screw arrangement disposed at the forward end of the machine and functioning to engage and advance upwardly along the stalks of the corn, to hold the stalks firmly in position for cutting, and when necessary to straighten or lift them to an erect position, and also capable of cooperating with the feeding mechanism of the machine to deposit the severed corn, severed end first. on the feed apron or endless conveyor which leads to the inlet of the ensilage cutter. The corn is fed in such an advantageous manner to the ensilage cutter that the latter may operate at high speed and with full efficiency.

The machine is also so constituted that it may be and preferably is pulled across the fields of corn by means of a tractor and the ensilage which is blown out from its discharge spout may be received either in a trailer which follows the machine or into a wagon which moves alongside the machine or parallels the path thereof.

A still further object of the invention is to provide a machine of this character which is so constructed and organized that a single motor effectively but coordinately drives the various instrumentalities of the machine.

These objects of the invention and other ancillary advantages are attained by the mechanism, construction, and arrangement illustrated in the accompanying drawings, forming part hereof, in which—

Fig. 3 is a perspective view similar to Fig. 2 but viewing the machine from the opposite side;

Fig. 6 is a fragmentary perspective view viewing the lower portion of the front of the machine to illustrate the manner in which the screw conveyors, cutting mechanism, feed fingers, and endless conveyor apron are operatively inter-related, the view being taken from a point in front of the machine;

Fig. 7 is a view similar to Fig. 6 but looking down into the feed trough and viewing fragments of the screw conveyors from the rear; and Fig. 8 is a diagrammatic plan view illustrating the general lay-out of the machine and one way of driving its several instrumentalities and;

General description

Figure 1:
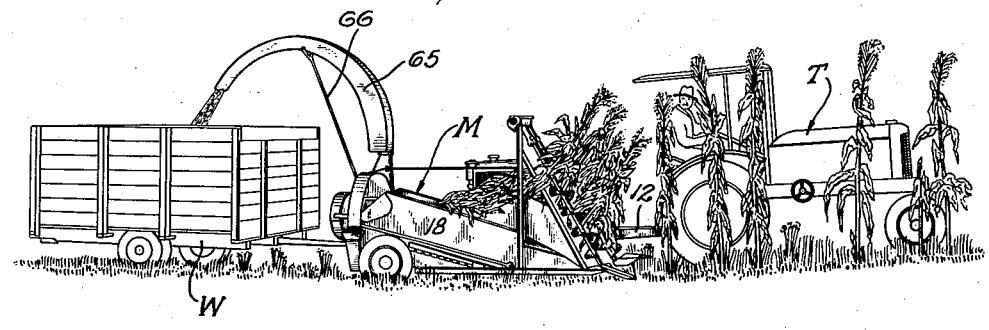
Fig. 1 is a perspective view of a machine for harvesting corn and converting it into ensilage and embodying the present invention, the machine being shown connected up to the tractor which pulls it and also operatively associated with the trailer into which the ensilage is blown.

Referring to the drawings and in particular to Fig. 1 the reference character M designates the machine as a whole. The machine is pulled across the corn field by means of a tractor designated as a whole at T and suitably hitched to the machine M. In the construction illustrated a tralier or wagon W is connected up to the rear end of the machine and receives the ensilage blown from the machine.

The machine M comprises generally a suitable frame or chassis 10 supported on a pair of ground wheels 11. A drawbar 12 is secured to the chassis 10 at one side thereof and projects from the forward end of the chassis. The drawbar 12 is connected up to the tractor in any suitable way as, for example, by means of a hitch illustrated diagrammatically at 13 (see Figs. 2 and 3).

An ensilage cutter designated generally at 14 is supported on chassis 10 at the rear thereof. The ensilage cutter extends only part way across the rear end of the chassis and is located on the opposite side of the machine from the drawer 12.

Figure 9:
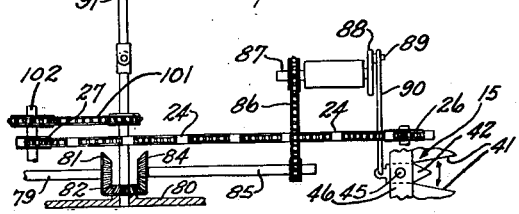
Fig. 9 is a diagrammatic view partly in vertical section and partly in side elevation, further illustrating the gearing incorporated in the drive line for driving the screw conveyors, the feed fingers, and the cutting mechanism.

Corn cutting means designated generally at 15 (see Figs. 6, 8 and 9) is supported at the forward end of the machine adjacent to the ground and is adapted to sever the stalks of standing corn at a point adjacent to the ground line.

Guides 16 are supported on the chassis adjacent to the cutting means. There are a pair of these guides which parallel each other and have inwardly converging guide walls 17 which function to guide the stalks of corn into the field of action of the cutting mechanism 15 and into the field of action of the control and conveying mechanism cooperatively related to the cutting means.

Figure 2:
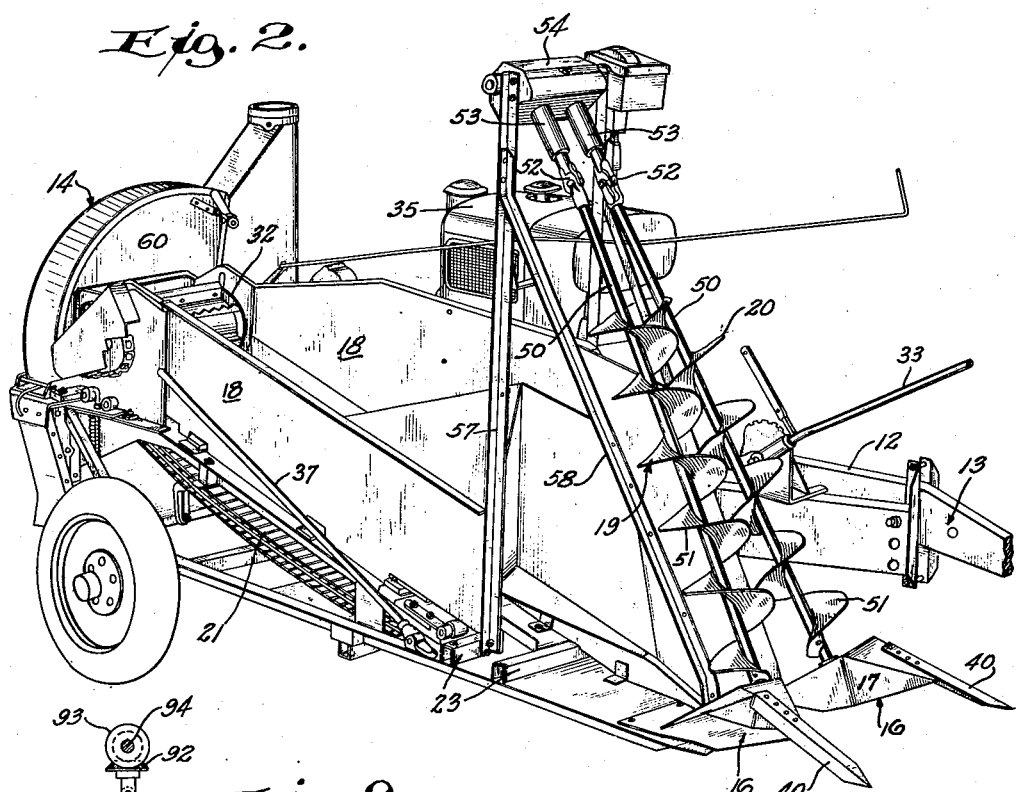
Fig. 2 is a perspective view of the machine itself, the machine being viewed from the front and from one side.

A feed trough 18 extends from the guides 16 upwardly and rearwardly to the inlet of the ensilage cutter. The side walls of trough 18 slant downwardly and inwardly as shown in Figs. 2, 7 and 8 to guide the butt ends of the corn stalks as they enter the trough.

Control screws 19 and 20 are supported for rotation adjacent the opposite sides of the forward ends of the feed trough. Those screws 19 and 20 are power driven and extend upwardly and rearwardly at an angle, the forward ends of the side walls of the feed trough 18 being appropriately inclined or sloped to permit this disposition of the control screws.

An endless feed conveyor or apron 21 extends from the inlet to the ensilage cutter 14 downwardly at an angle toward the corn cutting means 15. The upper run of the feed conveyor 21 which travels upwardly toward the inlet of the ensilage cutter 14 constitutes the bottom of the feed trough 18 for the major portion of its length.

A combination bridge plate and runway 22 extends from a point just rearwardly of the cutter 15 across the space between the cutter and the feed conveyor and then up over the feed conveyor for a substantial portion of its length, this bridge plate and runway tapering, however, to the inner side wall of the feed trough as shown to advantage in Figs. 6, 7, and 8. The outer side of the feed trough 18 extends inwardly on a slant toward plate 22 to provide a V-shaped trough for the butt ends of the cornstalk as they pass up the trough 18 from cutter 15. The combination bridge plate and runway is supported on and secured to inverted cross channels 23 carried by structural members of the frame of the machine and is also appropriately attached to the inner side wall of the feed trough.

The plate 22 is disposed substantially horizontal in its transverse contour and slants gradually upward from the level of the cutter 15 to the inclined feed conveyor apron 21 to support the butt ends of the severed cornstalks as they are transmitted from the cutter 15 to the apron 21. This transmittal of the cornstalks to the apron 21 is effected rapidly by the feed fingers 24.

An endless series of feed fingers 24 is provided. These feed fingers 24 are carried by an endless sprocket chain 25 which is trained or reeved about sprocket wheels 26 and 27. The sprocket wheel 26 is located below but within the lateral confines of the trough 18 at the lower end thereof, whereas the sprocket chain 27 is located just outside the feed trough toward the upper end thereof, as clearly shown in Fig. 8. With this construction the active run of the chain 25 and the feed fingers 24 moving along therewith travels upwardly through the feed trough 18 and along the combination bridge plate and runway 22, whereas the return run of the sprocket chain 25 and feed fingers 24 moves downwardly along the outside of the inner wall of the feed trough 18.

At the upper end of the feed trough 18 and adjacent to the inlet of the ensilage cutter 14, the conventional feed rollers 30 and 31 and beater roll 32 are provided.

An internal combustion engine or other suitable power plant 35 is securely bolted to the chassis 10 to one side of the feed trough 18 and supplies the power to drive all of these instrumentalities of the machine, this power being transmitted through motion transmission trains or gearing which will later be fully described.

The height of the cutter 15 and guides 16 from the ground is adjustable by means of the lever 33 which is connected by crank arm 34 and link 36 to the rear end of the pivotal drawbar 12. The usual stalk guide 37, shown in Fig. 2, may be attached on the outside of trough 18 to clear the standing stalks away from the machine.

The guides

The guides 16 comprise box-like structures of tapered formation equipped with forwardly projecting pointed spurs 40 as illustrated in Figs. 2 and 3. Their inner walls converge toward the cutting means.

The cutting means

The cutting means 15 include space fixed cutting blades 41 mounted on the guides 16 and having opposed spaced cutting edges. Cooperable with the fixed cutting blades 41 is an oscillating cutting blade 42. The blade 42 has a V-shaped formation at its forward end and sides or legs of the V present cutting edges 43 and 44. Rearwardly of the cutting edges 43 and 44 the oscillating blade is pivotally supported as at 45 on a cutter supporting bar 46. The cutter supporting bar 46 is carried on the guides just forwardly of the cross channels which support the bridge plate and extends transversely across the fixed cutting blades. The oscillating cutter 42 also has a rearwardly projecting arm which is adapted to be operatively connected to its driving means to be later described.

The control screws

The control screws 19 and 20 have the structure of screw conveyors in that they include elongated shafts 50 and spiral blades 51, the convolutions of which are rather widely spaced on their respective shafts 50. The lower end of each shaft 50 is rotatably supported in a suitable bearing provided therefore in the guide 16 on which it is mounted. The upper end of each shaft 50 is connected by means of a universal joint 52 to a short shaft 53 which is rotatably supported in a suitable bearing provided therefore in a gear box 54. The gear box 54 is fixed to uprights or standards 57 which are attached to the side walls of the feed trough 18 and their lower ends to stationary members of the frame of the machine. These standards are stiffened and strengthened by means of braces 58 which are inclined along the front end of the corresponding sides of feed trough 18 to the rear of screws 19 and 20 and to which the sides of the feed trough are secured. The guides 16 are secured to the forward ends of braces 58 and to the lower framework of the machine. The mounting of the control screws 19 and 20 is such that their convolutions are staggered with respect to each other as may be clearly seen in Fig. 8 and they are not only angled upwardly and rearwardly but are angled toward each other so that the upper convolution of their blades are closer together than their lower convolutions.

*The ensilage cutter*

The ensilage cutter 14 may be of any suitable or conventional construction. For example, it may be of the type described and claimed in my United States Letters Patent 1,793,476, granted February 24, 1931, for an Ensilage cutter. As illustrated generally in the drawings, the ensilage cutter 14 includes a blower housing 60 supported on and secured to the chassis and containing interiorly a rotor 61 carrying the usual fan blades 62 and rotary cutters (not shown). The rotary cutters co-act in the usual way with the fixed cutter on a ledger plate (also not shown). The blower housing has a suitable inlet into which the corn and corn stalks are fed by the endless conveyor 21 and the feed and beater rolls 30, 31, and 32 and also has a tangential outlet 63 from which the ensilage or fodder is discharged. The rotor 61 is fixed to a drive shaft 64 rotatably supported on suitable bearings provided therefore on the blower housing.

*The delivery spout*

An arched or curved delivery spout 65 is provided, and at one end, is suitably connected to the outlet 63 of the blower housing. The connection between the delivery spout 65 and the outlet 63 is preferably of a swivel character so that the spout 65 may be angularly adjusted to deliver the ensilage to a trailer or wagon W as shown in Fig. 1, which is in tandem relation to the machine or to a wagon which is pulled alongside the machine but which is not shown. A brace or strut 66 is suitably supported at its lower end to a fixed part of the machine and has its upper end in supporting interengagement with the underside of an intermediate portion of the delivery spout.

*Mechanism for driving the instrumentalities of the machine*

Figure 4:
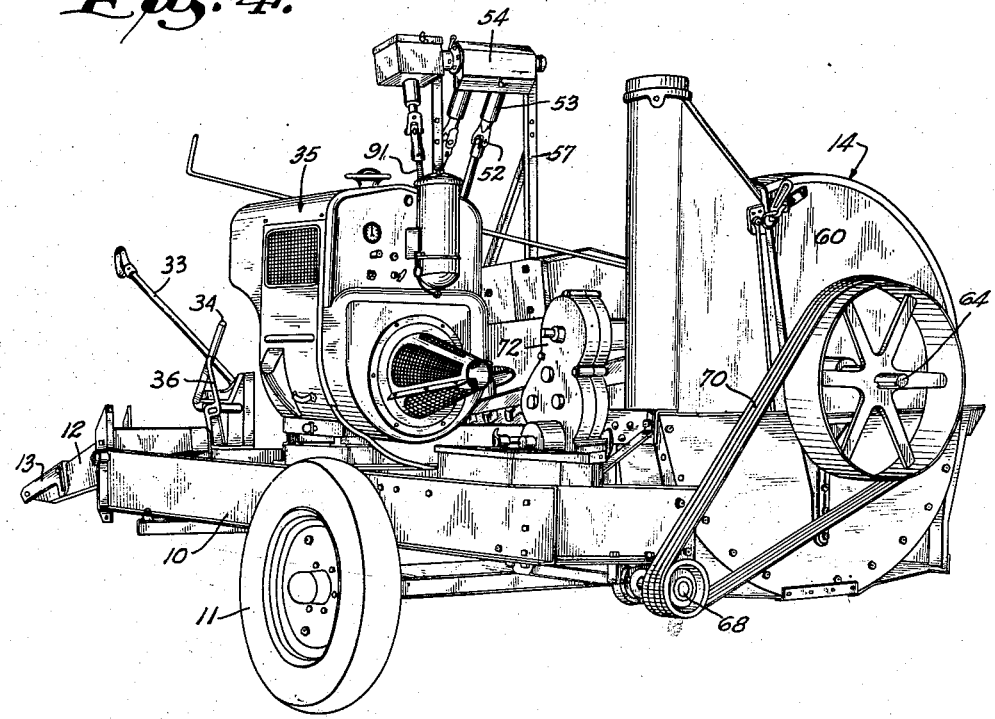
Fig. 4 is a perspective view viewing the machine from the rear end, looking at it from the motor side.

The crank shaft 67 of the motor 35 actuates a counter shaft 68 through a multiple belt and pulley drive 69 (see Fig. 3) and the counter shaft 68 in turn actuates the drive 64 through a multiple belt and pulley drive 70 (see Fig. 4). In this way the motor 35 drives or rotates the rotor 61 and consequently the fans and movable cutters of the ensilage cutter 14. The shaft 64 projects forwardly beyond the blower housing of the ensilage cutter. Chain and sprocket gearing 71 transmits the motion of the shaft 64 to a change speed gear set 72. This change speed gear set 72 drives two output shafts 73 and 74.

Figure 5:
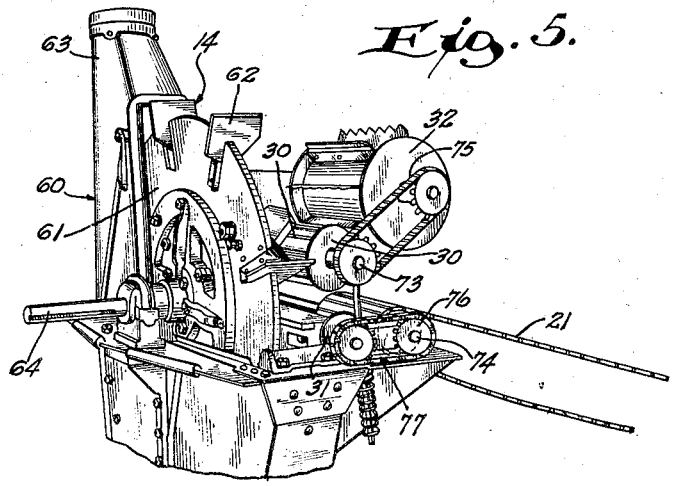
Fig. 5 is a fragmentary perspective view illustrating the ensilage cutter and the feed and beater rolls associated with the inlet of the ensilage cutter, a portion of the blower housing and part of the supporting structure of the rolls being omitted for the sake of illustration.

The feed roll 30 is mounted on, fixed to, and driven by the output shaft 73 and this shaft 73 also drives the beater roll 32 through chain and sprocket gearing 75 (see Figs. 5 and 8). The output shaft 74 extends through and drives the driving roller 76 of the endless belt or apron 21 and also drives the lower feed roll through chain and sprocket gearing 77. The forward end of the drive shaft 64 is connected by means of a universal joint or coupling 78 to shaft 79 which inclines downwardly and forwardly along the inner side of the inner wall of the trough 18.

The shaft 79 has its lower end rotatably mounted in a bearing provided therefore in a gear box 80 fixed to the frame of the machine. A beveled driving gear 81 is secured to the lower and forward end of the shaft 79 within the gear box 80 and meshes with a driven bevel gear 82 which is keyed or fixed to a vertical shaft 83 rotatably mounted in suitable bearings provided in the gear box.

The motion transmitted from the shaft 79 to the vertical shaft 83 is utilized through separate motion transmission trains to drive the cutting mechanism 15, the control screws 19 and 20, and the sprocket chain 25 which actuates the feed fingers 24.

For the purpose of actuating the cutting mechanism 15 a driven bevel gear 84 is meshed with the bevel gear 81 on the shaft 83. The bevel gear 84 is fixed to one end of a shaft 85 rotatably supported on suitable bearings and connected by means of chain and sprocket gearing 86 to a counter shaft 87. A disk 88 is fixed to one end of the counter shaft 87 and is provided with a crank pin 89 pivotally inter-connected with one end of a pitman 90, the opposite end of which is pivotally connected with the driving arm of the cutter.

For the purpose of driving the control screws 19 and 20 a flexible shaft or drive line 91 is coupled up to the shaft 83 and extends up to the top of the machine and actuates a driving gear 92 rotatably supported in a gear housing. The bevel gear 92 meshes with a bevel gear 93 also rotatably mounted in the gear housing and fixed to a cross shaft 94. The cross shaft 94 extends into gear box 54 and has the bevel gear 95 fixed thereon and meshing with a bevel gear 96 fixed to one of the shafts 53 of one of the control screws.

Twin spur gears 97 which inter-mesh and which are fixed to the corresponding shafts 53 serve to provide a driving connection between the shaft 53 driven by gear 96 and the other shaft 53 and to constrain the control screws 19 and 20 to corresponding motion of the screws upwardly by rotation of the same in opposite directions.

For the purpose of driving the sprocket chain which carries and actuates the feed fingers, chain and sprocket gearing 101 inter-connects the drive shaft 91 and a short vertical shaft 102. The shaft 102 is rotatably supported in suitable bearings provided therefore on the frame of the machine and at its lower end is inter-connected with the sprocket wheel 27 so as to support and drive the sprocket chain 25.

*Operation*

In use, the machine M is pulled along the rows of corn by the tractor T and the machine in turn pulls the trailer or wagon W along in the manner illustrated in Fig. 1. It is not essential that a trailer be employed as it is feasible and sometimes desirable to have a separately propelled wagon move alongside the machine, and in such instance the spout 65 is appropriately adjusted.

As the machine is pulled along a row of corn the motor 35 is, of course, running and its clutch 35' engaged. As a consequence the ensilage cutter 14, the feed and beater rolls 30, 31, and 32, the endless belt or apron 21, the corn cutting means 15, the sprocket chain 25 and its feed fingers 24, and the control screws 19 and 20 are all power driven.

The gear ratios in the drive lines to these several instrumentalities are so selected and so related to each other and to the ground speed of the machine that the control screws 19 and 20 will function to engage and confine the stalks therebetween and, if necessary, lift up stalks of corn which may be angled over, and hold the stalks erect while they are subject to the action of the cutting means 15 which, of course, serves the job of severing the stalks at a point closely adjacent the ground line. After the stalks are severed they are still engaged by the control screws 19 and 20 and their lower ends are immediately brought under the influence of the feed fingers 24. The sprocket chain 25 which carries and actuates the feed fingers 24 is driven at a faster rate of speed than the speed to which the machine travels over the ground. For example, as the machine travels over the ground at a ground speed of, say, 265 feet per minute, then the sprocket chain 25 which carries the feed fingers 24 may advantageously be driven at the rate of 300 feet per minute. At the same time the control screws 19 and 20 may be rotated at the rate of approximately 250 R. P. M. As a result, the corn stalks are fed severed ends first or foremost up through the feed trough 18. It is also advantageous to drive the endless belt or feed apron 21 at a slow rate of speed, and where the speeds are of the order designated the feed apron 21 might well be driven at the rate of approximately 100 feet per minute.

The particular speeds mentioned are only typical and are not intended to be restrictive. The advantage of having the feed apron run at a slower rate of speed lies in the fact that with such an operating characteristic the corn and corn stalks will be built up or accumulated in the feed trough 18. Consequently, there will always be an adequate supply of the corn and corn stalks to permit the ensilage cutter 14 to operate at a high speed and with full efficiency.

The twin screws 19 and 20 are disposed at a slight angle to each other with the upper ends closer than the lower ends so that the cornstalks will enter between the screws at the lower end without difficulty after which the closer intermeshed screw flights at the upper ends engage the stalks and hold them for severing by cutter 15.

After the stalk is severed the fingers 24 rapidly carry the butt over plate 22 rearwardly to apron 21 while the body of the stalk, at a substantial height, is supported by the screws 19 and 20, thereby tilting the stalk forward to present the butt end to the feed rolls 30 and 31.

The forward end of the stalk is supported by the screws 19 and 20 at a proper level as the stalk feeds rearwardly through rolls 30 and 31 into cutter 14. When the stalk has fed into the cutter 14 sufficiently to release the outer end of the stalk from the screws 19 and 20 the stalk rests upon the next succeeding stalks which are supported by the apron 21 and screws 19 and 20.

Actually the rapid forward movement of the machine will supply sufficient stalks in rapid succession to effect a constant feeding of a substantial number of stalks in successive stages of feed through rolls 30 and 31 at all times, to keep the cutter 14 operating at a predetermined speed and efficiency. In general, the number of stalks being fed at any one time to cutter 14 will be equivalent to the number of stalks contained in the usual bundle heretofore fed to silo fillers.

The screws 19 and 20 are quiet and rotate in a direction in which they tend to feed the tilted stalks toward the feed rolls 30 and 31. They take the place of noisy multiple chain feeds and are considerably more efficient. The flights of the screws are spaced axially sufficiently to provide for the passage of ears and stalk therethrough without difficulty.

The fineness of chopping can be regulated by changing the relative size of the sprockets for chain 71 to alter the speed of the apron 21, beater 32 and feed rolls 30 and 31 relative to the speed of rotor 61 in cutter 14. A slower apron 21 effects a finer cut and a faster apron 21 effects a coarser cut.

The regulation of the speed of apron 21 and feed rolls 30 and 31 will also depend upon variations in engine speed and the stand of corn and forward feed of the machine to effect the most efficient feed of corn to the cutter 14.

The material, after being chopped up in the ensilage cutter is, of course, blown and propelled through the delivery spout 65 into the trailer or wagon W.

By providing the control screws 19 and 20 and having them rearwardly inclined, the overall length of the machine is substantially decreased.

While the machine is particularly designed and adapted for use in harvesting corn, it may also be advantageously employed for harvesting sugar cane, sun flowers, and sorga.

Another variation that is contemplated by the present invention is in connection with the mechanism for driving the cutting mechanism, the control screws, and the feed fingers. Instead of direct drive lines from the motor, these instrumentalities may be advantageously driven from the ground wheels or from the axle which turns with the ground wheels. The advantage of ground wheel drive resides in the fact that speeds of the several instrumentalities are then all synchronized.

While I have shown and described one embodiment of my invention and this in a form which may be advantageously used in practice, it is to be understood that the form shown and particularly described has been selected solely for the purposes of illustration, and that various changes in the size, shape, and arrangement of parts may be resorted to without departing from the inventive concept and the scope of the appended claims.

What I claim as my invention and desire to secure by Letters Patent is:

1. A machine for harvesting corn and converting it into ensilage comprising a mobile frame, cutting means carried by the forward end of the frame and adapted to sever corn stalks at a point near the ground, a pair of upwardly and rearwardly inclining rotary control screws engageable with the corn stalks to exert an upward lift thereon, guides projecting beyond the screws and effective to guide corn stalks into the range of action of the screws, an ensilage cutter carried by the rear end of the frame, a feed trough extending from the cutting means to the ensilage cutter, the control screws flanking the entrance end of the feed trough, an endless conveyor having its upper run extending along the bottom of the feed trough for feeding the severed corn to the ensilage cutter, and an endless series of feed fingers having one run traveling upwardly through the entrance end of the trough and over the top of the endless conveyor to tilt the stalks so that they are fed, severed end first, upwardly through the trough to the ensilage cutter, said screws cooperating with said fingers to effect tilting of the successive cornstalks and cooperating with said conveyor to support and urge the cornstalks rearwardly in the direction of feed of the same to the ensilage cutter.

2. A machine for harvesting corn and converting it into ensilage comprising a mobile frame, cutting means carried by the forward end of the frame and adapted to sever corn stalks at a point near the ground, a pair of upwardly and rearwardly inclining rotary control screws engageable with the corn stalks to exert an upward lift thereon, guides projecting beyond the screws and effective to guide corn stalks into the range of action of the screws, an ensilage cutter carried by the rear end of the frame, a feed trough extending from the cutting means to the ensilage cutter, the control screws flanking the entrance end of the feed trough, an endless conveyor having its upper run extending along the bottom of the feed trough for feeding the severed corn to the ensilage cutter, an endless series of feed fingers having one run traveling upwardly through the entrance end of the trough and over the top of the endless conveyor to tilt the stalks so that they are fed, severed end first, upwardly through the trough to the ensilage cutter, said screws cooperating with said fingers to effect tilting of the successive cornstalks and cooperating with said conveyor to support and urge the cornstalks rearwardly in the direction of feed of the same to the ensilage cutter, and power means of driving the cutting means, control screws, endless conveyor, and endless series of feed fingers, the feed fingers being driven faster than the ground speed of the machine and the endless conveyor being driven at a relatively slow rate of speed.

3. A machine for harvesting corn and converting it into ensilage and comprising a mobile frame, cutting means carried by the frame and adapted to sever corn stalks at a point near the ground, rotary control screws engageable with the corn stalks to hold the same upright as they are severed by the cutting means, an ensilage cutter carried by the frame, a feed trough extending from the control screws and cutting means to the ensilage cutter, an endless conveyor having its upper run extending along the bottom of the feed trough and feeding the severed corn into the ensilage cutter, tilting means operating in the trough for tilting the corn stalks after they are severed and while the stalks are held by said screws so as to feed the severed end foremost through the feed trough, and a motor mounted on the frame and motion transmission means actuated by the motor and operatively connected to the ensilage cutter, the endless conveyor, the control screws, the cutting means, and the tilting means and functioning to drive the tilting means at a rate of speed faster than the ground speed of the machine and also functioning to drive the endless conveyor at a relatively slow speed whereby the severed corn stalks are fed, severed end first, through the feed trough but accumulate therein sufficiently to provide for efficient and high speed operation of the ensilage cutter.

4. A machine for harvesting corn and converting it into ensilage comprising a mobile frame adapted to be advanced across a corn field, cutting means carried by the frame and adapted to sever corn stalks at a point near the ground as the machine moves across the corn field, means engageable with the corn stalks to hold the same upright as they are severed by the cutting means, an ensilage cutter carried by the frame, a feed trough extending from the cutting means to the ensilage cutter, an endless conveyor for feeding the severed corn through the trough to the ensilage cutter, and an endless series of feed fingers having one run travelling upwardly through the entrance end of the trough and over the top of the endless conveyor to tilt the stalks while they are held by said engaging and holding means so that they are fed, severed end first, upwardly through the trough to the ensilage cutter.

5. A machine for harvesting corn and converting it into ensilage and comprising a mobile frame adapted to be advanced across a field of standing corn, cutting means carried by the frame and adapted to sever corn stalks at a point near the ground, an ensilage cutter carried by the frame, a feed trough extending from the cutting means to the ensilage cutter, a pair of upwardly and rearwardly inclining rotary control screws flanking the entrance end of the feed trough and in cooperative relation to the cutting means to engage the standing corn and exert an upward lift on the corn stalks as the same are severed by the cutting means, an endless conveyor having its upper run extending along the bottom of the feed trough for feeding the severed corn into the ensilage cutter, an endless sprocket chain supported on one of the side walls of the trough with one run disposed within the trough and travelling upwardly therein at the entrance end thereof, and feed fingers carried by the chain and engageable with the lower ends of the severed corn stalks to tilt the stalks so that they are fed, severed end first, upwardly through the trough to the ensilage cutter, while the outer ends of the tilted stalks are supported by said screws.

6. A machine for harvesting corn and converting it into ensilage and comprising a mobile frame, cutting means carried by the frame and adapted to sever corn stalks as the machine moves over a corn field, a pair of rotary control screws mounted on the frame and including axial shafts and spiral blades, the shafts inclining upwardly and rearwardly and converging toward each other toward their upper ends above said cutting means, the convolutions of the blades having their corresponding peripheral edges in closely spaced relation and being staggered with respect to each other, and means cooperating with said screws to effect tilting and feeding of the stalks while the same are partially supported by said blades.

7. In a machine of the class described having an ensilage cutter, a feed conveyor leading to the entrance of said cutter, and means disposed at the forward end of the feed conveyor to sever standing cornstalks as the machine travels forwardly, a gathering and tilting device for the cornstalks comprising a pair of rotary spiral flights disposed in an upwardly and rearwardly slanting position ahead of said severing means and feed conveyor and on opposite sides of the entrance thereto, said flights winding in the opposite direction from each other about their respective rotary axes and in directions whereby the edge of the flights therebetween move upwardly and inwardly from the front as the flights rotate in opposite directions, and means to rotate said flights in opposite directions and with the edges thereof traveling upwardly and inwardly between the flights from the front to effect lifting and supporting of the stalks of corn during severing and tilting of the same for feeding longitudinally to the ensilage cutter.

8. In a machine of the class described having an ensilage cutter, a feed conveyor leading to the entrance of said cutter, and means disposed at the forward end of the feed conveyor to sever standing cornstalks as the machine travels forwardly, a gathering and tilting device for the cornstalks comprising a pair of rotary spiral flights disposed in an upwardly and rearwardly slanting position ahead of said severing means and feed conveyor and on opposite sides of the entrance thereto, said flights winding in the opposite direction from each other about their respective rotary axes and in directions whereby the edge of the flights therebetween move upwardly and inwardly from the front as the flights rotate in opposite directions, means to rotate said flights in opposite directions and with the edges thereof traveling upwardly and inwardly between the flights from the front to effect lifting and supporting of the stalks of corn during severing and tilting of the same for feeding longitudinally to the ensilage cutter, and means rapidly moving the severed ends of the sucessive stalks rearwardly from said severing means while the upper end of the stalks are enmeshed in said spiral flights to effect tilting of the stalks in a direction to feed the butt ends first into the ensilage cutter, said flights serving to support the outer ends of the stalks therebetween during feeding of the same to the cutter and to urge the stalks in the direction of said feeding movement.

9. In a machine of the class described having an ensilage cutter, a feed conveyor leading to the entrance of said cutter, and means disposed at the forward end of the feed conveyor to sever standing cornstalks as the machine travels forwardly, a gathering and tilting device for the cornstalks comprising a pair of rotary spiral flights disposed in an upwardly and rearwardly slanting position ahead of said severing means and feed conveyor and on opposite sides of the entrance thereto, said flights winding in the opposite direction from each other about their respective rotary axes and in directions whereby the edge of the flights therebetween move upwardly and inwardly from the front as the flights rotate in opposite directions, and means to rotate said flights in opposite directions and with the edges thereof traveling upwardly and inwardly between the flights from the front to effect lifting and supporting of the stalks of corn during severing and tilting of the same for feeding longitudinally to the ensilage cutter, said spiral flights being spaced apart at the bottom to provide for the entrance of cornstalks therebetween prior to severing of the latter, and converging toward each other at the top to provide for the intermeshing of the flights to support the tilted cornstalks in position for feeding into the ensilage cutter.

10. In a machine of the class described having an ensilage cutter, a feed conveyor leading to the entrance of said cutter, and means disposed at the forward end of the feed conveyor to sever standing cornstalks as the machine travels forwardly, a gathering and tilting device for the cornstalks comprising a pair of rotary spiral flights disposed in an upwardly and rearwardly slanting position ahead of said severing means and feed conveyor and on opposite sides of the entrance thereto, said flights winding in the opposite direction from each other about their respective rotary axes and in directions whereby the edge of the flights therebetween move upwardly and inwardly from the front as the flights rotate in opposite directions, means to rotate said flights in opposite directions and with the edges thereof traveling upwardly and inwardly between the flights from the front to effect lifting and supporting of the stalks of corn during severing and tilting of the same for feeding longitudinally to the ensilage cutter, and means rapidly moving the severed ends of the successive stalks rearwardly from said severing means while the upper end of the stalks are enmeshed in said spiral flights to effect tilting of the stalks in a direction to feed the butt ends first into the ensilage cutter, said spiral flights being spaced apart at the bottom to provide for the entrance of cornstalks therebetween prior to severing of the latter, and converging toward each other at the top to provide for the intermeshing of the flights to support the tilted cornstalks in position for feeding into the ensilage cutter.

HENRY M. GEHL.

REFERENCES CITED

The following references are of record in the file of this patent:

UNITED STATES PATENTS

| Number | Name | Date |
|---|---|---|
| 1,130,074 | Dunkleberger | Mar. 2, 1915 |
| 1,161,252 | Ronning | Nov. 23, 1915 |
| 1,419,347 | Baird | June 13, 1922 |
| 1,700,421 | Ronning et al. | Jan. 29, 1929 |
| 1,883,402 | Ronning et al. | Oct. 18, 1932 |
| 2,110,471 | Petruchkin | Mar. 8, 1938 |